United States Patent [19]

Satoh et al.

[11] 4,433,748

[45] Feb. 28, 1984

[54] INSTRUCTING SYSTEM FOR A FOUR-WHEEL DRIVE VEHICLE

[75] Inventors: Tetsuo Satoh, Ohta; Masaaki Ohgami, Musashino; Shoji Ogata, Ohta, all of Japan

[73] Assignee: Fuji Jukogyo Kabushiki Kaisha, Tokyo, Japan

[21] Appl. No.: 320,776

[22] Filed: Nov. 12, 1981

[30] Foreign Application Priority Data

Nov. 11, 1980 [JP] Japan .................. 55-158352

[51] Int. Cl.³ .................. B60K 17/34; B60K 23/08
[52] U.S. Cl. .................. 180/247; 340/52 B; 361/238
[58] Field of Search .......... 180/247; 340/52 R, 52 B; 303/105; 361/238, 242, 243; 324/161

[56] References Cited

U.S. PATENT DOCUMENTS 3,776,322 12/1973 Misch et al. .................. 361/238
4,086,563 4/1978 Bachman .................. 340/52 B
4,298,085 11/1981 Moroto et al. .................. 180/247

Primary Examiner—Joseph F. Peters, Jr.
Assistant Examiner—Donn McGiehan
Attorney, Agent, or Firm—Martin A. Farber

[57] ABSTRACT

An instructing system for a four-wheel drive vehicle powered by an internal combustion engine comprises a transmission for transmitting power from the engine to two main driving wheels, a clutch for selectively transmitting the power to auxiliary two-wheels, and a select lever for engaging the clutch. Speed detectors are provided for detecting both the speed of the two main driving wheels and the two auxiliary wheels. An electric circuit compares both speeds and turns on a lamp when the difference between both speeds exceeds a predetermined level, whereby slipping of the two main driving wheels is indicated.

7 Claims, 3 Drawing Figures

1

INSTRUCTING SYSTEM FOR A FOUR-WHEEL DRIVE VEHICLE

BACKGROUND OF THE INVENTION

The present invention relates to a system for indicating the necessity of four-wheel driving in a four-wheel drive vehicle for urging an operator to change the transmission from two-wheel drive operation to four-wheel drive operation.

In a four-wheel drive vehicle, a clutch device is provided to select either two-wheel drive operation or four-wheel drive operation. The clutch device is engaged by a manually operating select lever.

It is preferable to drive the vehicle in four-wheel drive on a slippery road such as roads with snow and ice. In a conventional four-wheel drive vehicle, the operator manipulates the select lever when he judges the necessity for the four-wheel drive. Generally, the judgement of the operator is not always suitable for the four-wheel drive and moreover, the operator must take care in judging the road condition.

SUMMARY OF THE INVENTION

The object of the present invention is to provide a system for a four-wheel drive vehicle which automatically instructs the operator to manipulate the shift lever of the clutch for changing the transmission from two-wheel drive to four-wheel drive.

According to the present invention, there is provided an instructing system for a four-wheel drive vehicle powered by an internal combustion engine comprising a transmission for transmitting power from the engine to two main driving wheels, a clutch for selectively transmitting the power to two auxiliary wheels, a select lever for engaging the clutch, means for detecting slipping of the two main driving wheels, a lamp for indicating the slipping, and an electric circuit responsive to a signal from the detecting means for turning on the lamp.

BRIEF DESCRIPTION OF DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENTS

Figure 1:
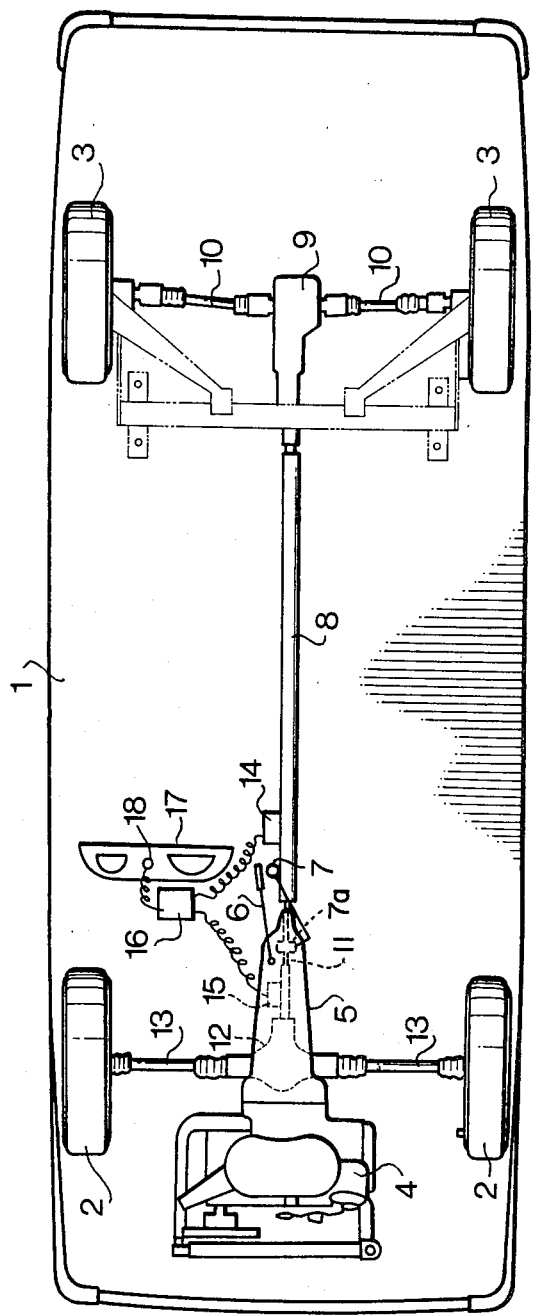
FIG. 1 is a plan view showing a four-wheel driving system provided with a system of the present invention.

Referring to FIG. 1, a vehicle has a body 1 with two front wheels and two rear wheels 3. An engine 4 is mounted on the body 1 at a front portion thereof. Power of the engine is transmitted to the front wheels through a transmission 5 and to both the front and rear wheels by engagement of a clutch in the transmission 5. Change of the transmission 5 is done by operating a change lever 6. The clutch 7a in the transmission 5 is engaged by operating a shift lever 7 for transmitting the power also to the rear wheels 3. The output of the transmission 5 is transmitted to the front wheels through a shaft 11, a front differential 12 and front axles 13. The power transmission to the rear wheels 3 comprises a propeller shaft 8 extending from the transmission 5, a rear differential 9 and rear axles 10.

In order to detect the rotational speed of the front and rear wheels 2, 3, respectively a front-wheel speed detector 15 is provided adjacent to the shaft 11 and a rear-wheel speed detector 14 is provided adjacent to the propeller shaft 8 for detecting speeds of both shafts, respectively. Outputs of both speed detectors 14 and 15 are connected to a judgement device 16 on output of which is connected to a lamp 18 on an instrument panel 17 for indicating the necessity of for four-wheel driving.

Figure 2:
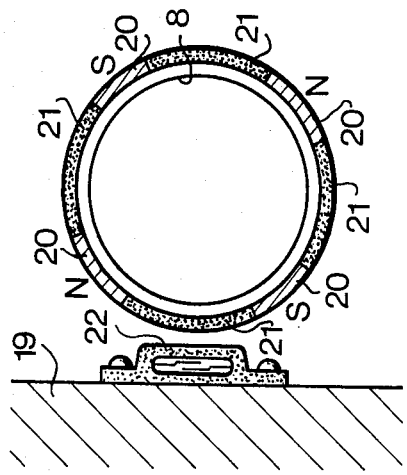
FIG. 2 is a sectional view showing a speed detector.

Referring to FIG. 2 showing one of the speed detectors 14 and 15, a plurality of permanent magnets 20 are circumferentially arranged on the propeller shaft 8 (or similarly on the shaft 11) and secured thereto. The magnets 20 are separated from each other by synthetic resin 21 secured on the shaft. A reed switch 22 for the rear wheel speed is provided on a support 19 formed on the body 1 and positioned in the vicinity of the magnets 20 with a slight gap therefrom.

Figure 3:
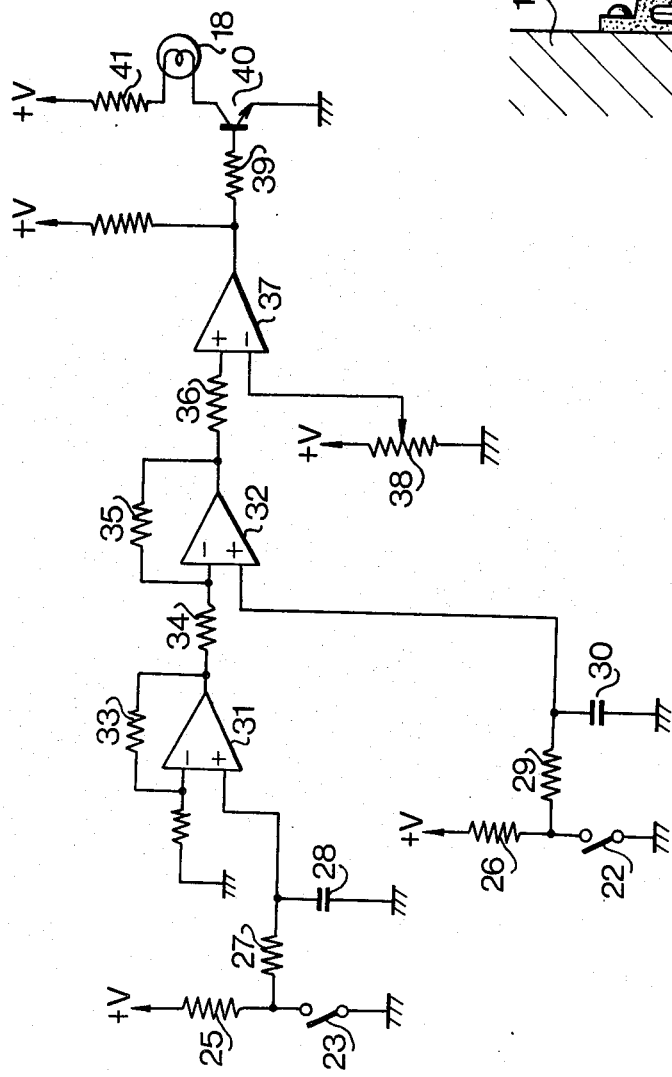
FIG. 3 is an electric circuit used in the system of the present invention.

Referring to FIG. 3, a similar reed switch 23 for the front-wheel speed detector 15 is connected to a voltage supply through a resistor 25 and the reed switch 22 for the rear-wheel speed detector 14 and a resistor 26 are connected to the voltage supply in series. A first integrator comprising a resistor 27 and a capacitor 28 is connected to the resistor 25 and the integrator is connected to a non-inverting input of an operational amplifier 31. Similarly, a second integrator comprising a resistor 29 and a capacitor 30 is connected to the resistor 26 and to a non-inverting input of an operational amplifier 32. The output of the operational amplifier 31 is fed back to the inverting input thereof through a resistor 33 and to the inverting input of the operational amplifier 32 through a resistor 34. The output of the operational amplifier 32 is fed back to the input thereof through a resistor 35 and to a non-inverting input of a comparator 37 through a resistor 36. The inverting input of the comparator 37 is connected to ground through a variable resistor 38. The output of the comparator 37 is connected to a base of a transistor 40 through a resistor 39. The lamps 18 and a resistor 41 are connected to the collector of the transistor 40 in series.

During two-wheel driving, the engine 4 drives the front wheels 2 which are operatively connected thereto through the transmission 5, the shaft 11 and the front axles 13. The respective speed of the front and rear wheels are detected by the speed detectors 14 and 15. In each speed detector, the reed switch 22 (23) is periodically closed by the magnets 20 in dependency on the speed of the wheels. Accordingly, the output of each integrator varies in dependency on the speed of the wheels. The output at the capacitor 28 is applied to the operational amplifier 32 through the amplifier 31 and the output at the capacitor 30 is also applied to the operational amplifier 32, where the speed of the front wheels is compared with that of the rear wheels. The output of the operational amplifier 32 is applied to the comparator 37 for comparing it with a reference voltage determined by the resistor 38. When the front wheels slip the output voltage of the operational amplifier 32 increases, and hence the output voltage of the comparator 37 increases. When the output of the comparator 37 exceeds a predetermined level, the transistor 40 turns on, so that the lamp 18 turns on. Thus, the advisability for changing to the four-wheel driving provided by the lamp 18. When the select lever 7 is manipulated by the operator in accordance with this advice, the two-wheel driving with the front wheels 2 only is changed to the four-wheel driving with both the front and rear wheels.

From the foregoing, it will be understood that the system of the present invention indicates the necessity for four-wheel driving. Thus, in accordance with this system, the operator can drive the vehicle without paying special attention to the road condition.

What is claimed is:

1. An instruction system for a four-wheel drive vehicle powered by an internal combustion engine, comprising
   a transmission means for transmitting power from said engine to two main driving wheels,
   a clutch means for selectively transmitting said power to two auxiliary wheels,
   a select lever means for engaging said clutch means,
   speed detector means for detecting speed of said two main driving wheels and said two auxiliary wheels, respectively, and for producing first and second voltage pulse trains dependent on the speed of the main driving wheels and auxiliary wheels, respectively,
   first and second integrator means for integrating said first and second voltage pulse trains,
   amplifier means for amplifying the difference between the integrated voltages from said first and second integrator means,
   comparator means for comparing the output of said amplifier means with a reference value and for producing an output voltage when said output is higher than said reference value, and
   indicating means responsive to the output voltage of said comparator means for signaling a slipping of the wheels.

2. The instruction system for a four-wheel drive vehicle powered by an internal combustion engine as set forth in claim 1, wherein
   the vehicle has a front wheel axle shaft on which front of said wheels are mounted, a rear wheel axle shaft on which rear of said wheels are mounted, an output shaft of the transmission means is operatively connected to said front wheel axle shaft, and a propeller shaft connected via said clutch means and operatively connected to said rear wheel axle shaft so as to transmit the power of the engine to the latter,
   said speed detector means comprises,
   a first speed detector means for detecting the speed of the output shaft of the transmission means, and
   a second speed detector means for detecting the speed of the propeller shaft, so as to detect the difference in speed between the speed of the wheels at the front and the speed of the wheels at the rear of the vehicle.

3. The system according to claim 1, wherein said indicating means comprises
   a transistor responsive to said output voltage of said comparator means so as to be turned on, and
   an electrical signaling device connected to said transistor in series for signaling the slipping of said wheels.

4. The system according to claim 1, wherein said amplifier means constitutes a single amplifier in said system.

5. An instruction system for a four-wheel drive vehicle having front wheels operatively connected by a differential and rear wheels operatively connected by a differential, the vehicle being powered by an engine and having separate shafts connected to the differentials for the front and rear wheels, respectively, and a transmission connected to the engine for driving one of said shafts and a clutch for operative connection of the other of said shafts to the transmission during four-wheel drive, said system comprising,
   a first and a second speed detection means for monitoring the speed, respectively, of a first and a second of said shafts, each of said speed detection means including an electric circuit comprising a capacitor, two resistors serially connected between a source of electric power and one terminal of said capacitor, and a switch connecting an electric circuit between a second terminal of said capacitor and a junction between said resistors,
   activation means connected to said first and said second shafts for opening and closing each of said switches at a frequency proportional to the speed, respectively, of said first shaft and second shaft to provide output signals from said capacitors dependent on the speeds of rotation of said first and said second shafts, respectively, a difference between said output signals occurring upon the slipping of at least one of the wheels driven by said engine, and
   indicator means including a comparator circuit for being responsive to said difference of said output signals of said capacitors for signaling an occurrence of the slipping greater than a predetermined amount set by said comparator circuit.

6. The system according to claim 5, wherein said indicator means includes an amplifier means for amplifying the difference between said output signals of said capacitors.

7. The system according to claim 6, wherein said amplifier means comprises an operational amplifier.

* * * * *